US010290058B2

(12) United States Patent
Liao et al.

(10) Patent No.: US 10,290,058 B2
(45) Date of Patent: May 14, 2019

(54) SYSTEM AND METHOD FOR DETERMINING AND UTILIZING SUCCESSFUL OBSERVED PERFORMANCE

(71) Applicant: Thomson Reuters Global Resources (TRGR), Baar (CH)

(72) Inventors: Wenhui Liao, Eagan, MN (US); Masoud Makrehchi, Markham (CA); Sameena Shah, White Plains, NY (US)

(73) Assignee: THOMSON REUTERS (GRC) LLC, New York, NY (US)

( * ) Notice: Subject to any disclaimer, the term of this patent is extended or adjusted under 35 U.S.C. 154(b) by 606 days.

(21) Appl. No.: 13/836,520

(22) Filed: Mar. 15, 2013

(65) Prior Publication Data

US 2014/0279684 A1 Sep. 18, 2014

(51) Int. Cl.
*G06Q 40/06* (2012.01)

(52) U.S. Cl.
CPC .................................... *G06Q 40/06* (2013.01)

(58) Field of Classification Search
CPC ......... G06C 30/0201; G06Q 10/06393; G06Q 10/0639; G06Q 30/0201
See application file for complete search history.

(56) References Cited

U.S. PATENT DOCUMENTS 6,778,982 B1 * 8/2004 Knight .................. G06Q 10/10 707/737
6,938,068 B1 8/2005 Kraft et al.
7,016,872 B1 * 3/2006 Bettis et al. ................ 705/36 R
7,185,065 B1 * 2/2007 Holtzman ........... G06F 17/2745 705/36 R
7,249,080 B1 7/2007 Hoffman et al.
7,356,484 B2 4/2008 Benjamin et al.
7,539,637 B2 5/2009 Gatto
7,636,680 B2 12/2009 Gatto
7,711,623 B2 5/2010 Smith et al.
7,877,309 B2 1/2011 Gatto et al.
7,890,408 B2 2/2011 Menchero et al.
2003/0065605 A1 * 4/2003 Gatto ..................... G06Q 40/00 705/36 R
2005/0203769 A1 * 9/2005 Weild, IV ............. G06Q 10/00 705/1.1

(Continued)

OTHER PUBLICATIONS

"Notification of Transmittal of the International Search Report and the Written Opinion of the International Searching Authority, or the Declaration". International Application No. PCT/US14/27345. 25 pages. International Filing Date: Mar. 14, 2014. dated Jul. 17, 2014.

(Continued)

*Primary Examiner* — William E Rankins
(74) *Attorney, Agent, or Firm* — Faegre Baker Daniels LLP

(57) ABSTRACT

In embodiments, a message retriever accesses a plurality of messages and a message filter identifies, within the accessed messages, a set predictive messages. The risk/return-related messages are analyzed to identify associated return advisors. The return advisors are evaluated and ranked according to advisor scores, and risk/return-related decisions referenced in the messages are also identified, evaluated, and ranked. The ranked return advisors and decisions are used to facilitate assessment of future performance of an item or entity.

14 Claims, 6 Drawing Sheets

(56) References Cited

U.S. PATENT DOCUMENTS

| | | | | |
|---|---|---|---|---|
| 2006/0036694 | A1 | 2/2006 | Pricken et al. | |
| 2006/0167777 | A1* | 7/2006 | Shkedy | 705/35 |
| 2006/0195383 | A1 | 8/2006 | Masuda | |
| 2006/0242040 | A1 | 10/2006 | Rader | |
| 2007/0282730 | A1 | 12/2007 | Carpenter et al. | |
| 2008/0086363 | A1 | 4/2008 | Kass et al. | |
| 2008/0189634 | A1 | 8/2008 | Tevanian et al. | |
| 2010/0030722 | A1* | 2/2010 | Goodson et al. | 706/54 |
| 2010/0114795 | A1 | 5/2010 | Hudson et al. | |
| 2010/0179930 | A1 | 7/2010 | Teller et al. | |
| 2010/0257117 | A1* | 10/2010 | Shvadron | G06Q 10/04 705/36 R |
| 2010/0262454 | A1 | 10/2010 | Sommer et al. | |
| 2011/0112825 | A1 | 5/2011 | Bellegarda | |
| 2011/0137906 | A1 | 6/2011 | Cai et al. | |
| 2011/0296004 | A1 | 12/2011 | Swahar | |
| 2012/0136985 | A1 | 5/2012 | Popescu et al. | |
| 2012/0191596 | A1 | 7/2012 | Kremen et al. | |
| 2013/0346154 | A1* | 12/2013 | Holz et al. | 705/7.31 |
| 2014/0089125 | A1* | 3/2014 | Kinnersley | 705/26.3 |

OTHER PUBLICATIONS

C. Oh and O. Sheng, "Investigating predictive power of stock micro blog sentiment in forecasting future stock price directional movement," ICIS, pp. 57-58, 2011.

CC. Hsieh, et al., "Experts vs.The crowd: Examining popular news prediction performance on twitter," International Conference on WWW, 2013.

E. Gilbert and K. Karahalios, "Widespread worry and the stock market," International AAAI Conference on Weblogs and Social Media, pp. 58-65, 2010.

E. J. Ruiz, et al. "Correlating financial time series with micro-blogging activity," International Conference on Web Search and Data Mining, WSDM '12, pp. 513-522, 2012.

J. Bollena, et al., "Twitter mood predicts the stock market," Journal of Computational Science, 2(1):1-8, 2011.

J. Lehmann, et al. "Finding news curators in twitter," International World Wide Web Conference Committee, pp. 883-870, 2013.

N. K. Sharma, et al., "Inferring who-is-who in the twitter social network," SIGCOMM Computer Communication Review, 42(4), pp. 533-538, 2012.

R. Bandari, et al. "The pulse of news in social media: Forecasting popularity," Proceedings of the Sixth International AAAI Conference on Weblogs and Social Media, pp. 26-33, 2012.

S. Kumar, et al., "Whom should I follow? Identifying relevant users during crisis," Proceedings of the 24th ACM Conference on Hypertext and Social Media, pp. 39-147, May 1, 2013, ACM New York, NY, USA.

T. Wilson, et al., "Opinionfinder: A system for subjectivity analysis," HLT-Demo '05 Proceedings of HLT/EMNLP on Interactive Demonstrations, pp. 34-35, Oct. 7, 2005, Association for Computational Linguistics, Stroudsburg, PA, USA.

W. Liao, et al., Winning by Following the Winners: Mining the Behavior of Stock Market Experts in Social Media. Social Computing, Behavioral-Cultural Modeling and Prediction. Lecture Notes in Computer Science vol. 8393, 2014, pp. 103-110.

X. Zhang, et al., "Predicting stock market indicators through twitter I hope it is not as bad as I fear." Procedia—Social and Behavioral Sciences, 2011 26:55-62.

International Search Report and Written Opinion issued in PCT/US2013/054992, dated Mar. 11, 2014, 15 pages.

M. Makrehchi, et al., "Stock prediction using event-based sentiment analysis," IEEE/WIC/ACM International Conferences on Web Intelligence (WI) and Intelligent Agent Technology (IAT), 6 pages.

International Application No. PCT/US2013/054992. Notification Concerning Transmittal of International Preliminary Report on Patentability (Chapter 1 of The Patent Cooperation Treaty. International Filing Date: Aug. 14, 2013. dated Feb. 26, 2015.

* cited by examiner

300

| | | | 332 | 334 | 336 | 338 |
|---|---|---|---|---|---|---|
| | | | DAY | WEEK | MONTH | YEAR |
| 302 | 3/4/13 322 | "BUY TRI" 312 | S1(D) 340 | S1(W) 342 | S1(M) 344 | S1(Y) 346 |
| 304 | 3/4/13 324 | "BUY AFL" 314 | S2(D) | S2(W) | S2(M) | S2(Y) |
| 306 | 3/6/13 326 | "SELL TRI" 316 | S3(D) 348 | S3(W) | S3(M) | S3(Y) |
| 308 | 3/7/13 328 | "BUY HRB" 318 | S4(D) | S4(W) | S4(M) | S4(Y) |
| 310 | 3/8/13 330 | "SELL HRB" 320 | S5(D) | S5(W) | S5(M) | S5(Y) |

400

SYSTEM AND METHOD FOR DETERMINING AND UTILIZING SUCCESSFUL OBSERVED PERFORMANCE

BACKGROUND

Making successful decisions that involve a future performance of an item or entity often requires significant insight and/or predictive tools. This type of insight may come naturally to some individuals, but for most, it is acquired as a result of a significant amount of experience. However, capturing, and benefiting from, an individual's insight over an extended period of time has been difficult to accomplish.

SUMMARY

Embodiments of the present invention facilitate enhanced assessments of the future performance of an item or entity through the actions and analysis of multiple decision-makers particularly in view of their individual successes. For example, embodiments of the present invention relate to mining messages provided over networks for references to successful risk/return-related decisions such as indications of successful securities trades. The risk/return-related messages are analyzed to identify messaging users that regularly or semi-regularly generate messages having references to risk/return-related decisions. These messaging users are referred to herein as return advisors. In embodiments, the return advisors are evaluated and ranked based on potential returns associated with their risk/return-related decisions, which may also be evaluated and/or ranked. These rankings may be used to provide risk/return-related services.

Figure 1:
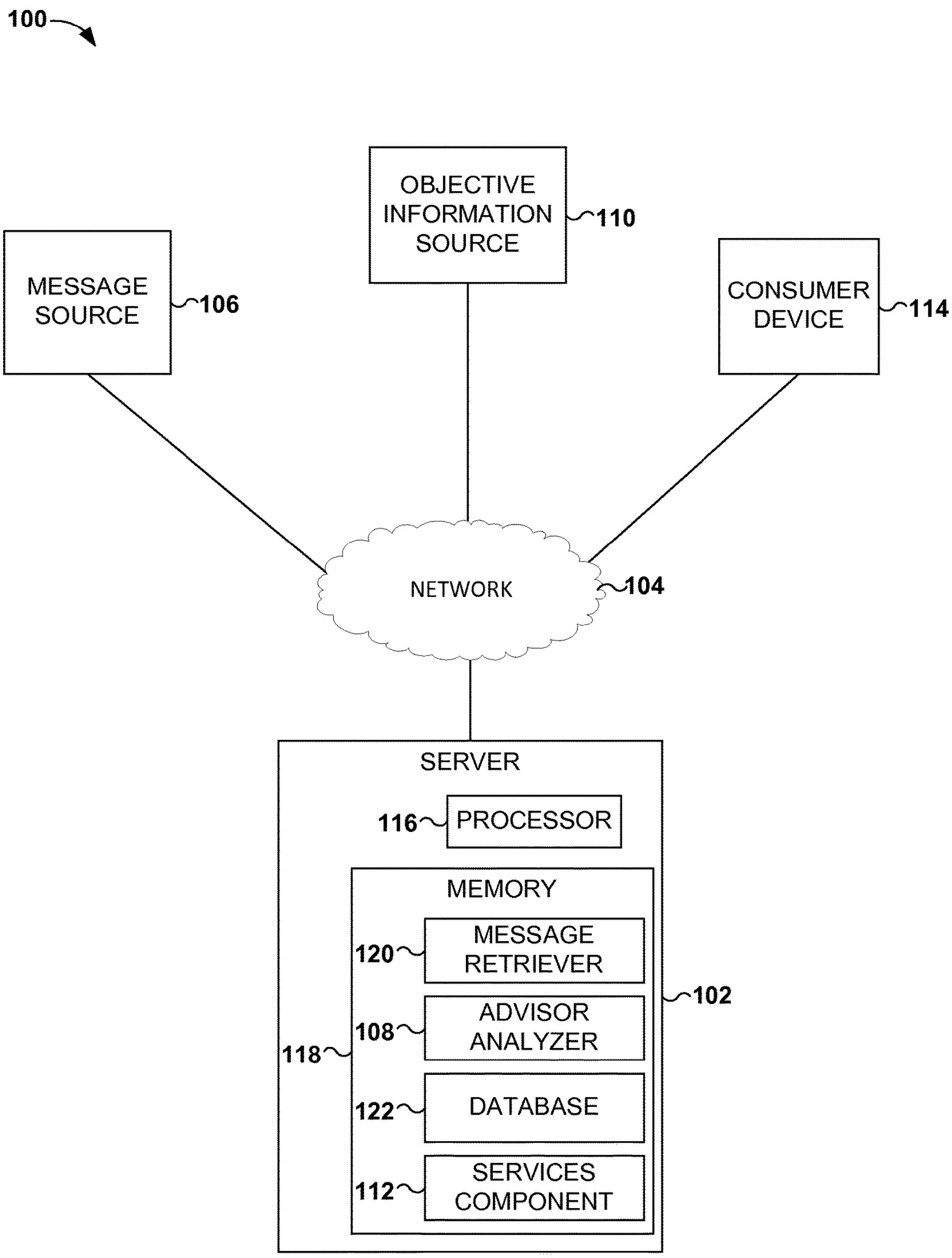
FIG. 1 is a block diagram illustrating an operating environment (and, in some embodiments, aspects of the present invention) in accordance with embodiments of the present invention.

While the present invention is amenable to various modifications and alternative forms, specific embodiments have been shown by way of example in the drawings and are described in detail below. The present invention, however, is not limited to the particular embodiments described. On the contrary, the present invention is intended to cover all modifications, equivalents, and alternatives falling within the ambit of the present invention as defined by the appended claims.

Although the term "block" may be used herein to connote different elements of illustrative methods employed, the term should not be interpreted as implying any requirement of, or particular order among or between, various steps disclosed herein unless and except when explicitly referring to the order of individual steps.

DETAILED DESCRIPTION

Users of communication platforms often generate messages about predictions of future performance of items or entities, including those concerning activities that involve risk and return (risk/return-related activities). Risk/return-related activities may include, for example, trading securities and other exchange traded products (ETPs), wagering money on outcomes of events such as sports games and horse races, and the like. Messaging users that regularly or semi-regularly provide information (generally, in the form of some type of prediction) about their risk/return-related activities, thoughts, opinions, and recommendations may be referred to as return advisors. Many of the messages generated by these users include references to risk/return-related decisions such as, for example, actions performed by the user, suggested by the user, and/or recommended by the user. In embodiments, acting in accordance with recommendations or actions of return advisors may result in potential financial returns. Return advisors often provide references to risk/return-related decisions through any number of a variety of types of messages such as, for example, social media messages, emails, short message service (SMS) messages, blog posts, web-published articles, and the like. According to embodiments, these messages may be analyzed to identify and evaluate return advisors and decisions referenced in their messages. A reference to a decision may be an explicit reference or an implicit reference (e.g., a decision may be implied from a prediction). These evaluations, as well as evaluations of the decisions themselves, may, for example, facilitate enhanced assessments of the future performance of an item or entity. These enhanced assessments may be used to provide recommendations to consumers, to generate risk/return-related products, or the like.

FIG. 1 depicts an example of an operating environment 100 (and, in some embodiments, aspects of the present invention) in accordance with embodiments of the present invention. As shown in FIG. 1, the operating environment 100 includes a server 102 that accesses messages, via a network 104, from a message source 106. The network 104 may be, or include, any number of different types of communication networks such as, for example, a short messaging service (SMS), a local area network (LAN), a wireless LAN (WLAN), a wide area network (WAN), the Internet, or the like. The message source 106 may include, for example, the Internet, an email provider, a social media platform, a website, or the like. According to embodiments, the server 102 implements an advisor analyzer 108 that uses the accessed messages to identify and evaluate return advisors. The advisor analyzer 108 also may evaluate decisions referenced in messages generated by the return advisors. These evaluations may facilitate enhanced assessments of future performances of one or more items or entities referenced in the messages. The advisor analyzer 108 may also utilize objective information obtained from an objective information source 110 to augment the assessments. The objective information source 110 may include, for example, a news provider, a statistics provider, a market data provider, or the like. The server 102 may use the assessments to facilitate any number of risk/return-related services such as, for example, by utilizing a services component 112, which a consumer of the services may access with a consumer device 114.

As shown in FIG. 1, the server 102 may be implemented on a computing device that includes a processor 116 and a memory 118. The advisor analyzer 108 may be stored in the memory 118. In embodiments, the processor 116 executes the advisor analyzer 108, which may facilitate analysis of messages to identify and evaluate return advisors and risk/return-related decisions referenced in messages generated by return advisors. As indicated above, these messages may include any number of different types of communications provided by messaging users over the network 104 such as, for example, social media messages, emails, SMS messages, blog posts, web-published articles, and the like. Social media messages may include any number of different types of communications provided by users through a social media platform. Social media platforms may include, for example, platforms that enable users to share information with other users and groups of users (e.g., through virtual communities and networks) and include platforms such as Facebook®, Twitter®, LinkedIn®, Foursquare®, StockTwits®, and the like. Social media messages may include, for example, "likes," wall posts, "follows," tweets, replies, and the like.

For example, a return advisor may be a Twitter® user that tweets about stock markets and his/her trading activities. In embodiments, this type of return advisor may be referred to as a trader, though he or she may not actually be a professional securities trader. For example, a ten-year old child with insight into the securities market may be identified as a trader based on tweets having references to decisions about stocks that should be bought or sold at certain times, though the child may never actually buy or sell stock. Other examples of a return advisor may include a Facebook® user that "likes" certain sports teams contemporaneously with games in which the teams are involved; a Facebook® user that posts about particular racing horses; and the like. Although the term "return advisor" is intended to refer to a classification applied to a messaging user that may provide messages having references to decisions related to any activity, event, or market that effectively involves an assessment of future performance of an item or entity, the particular example of the trader (e.g., a return advisor that provides information associated with trading securities) will be used throughout this disclosure to illuminate various aspects of embodiments of the present invention. References to traders, in lieu of other types of return advisors, are not meant to imply any limitation of the scope of the term "return advisor," but are used solely for purposes of clarity.

Still referring to FIG. 1, the server 102 includes a message retriever 120 that obtains, copies, or otherwise accesses messages from the message source 106. The message retriever 120 may store the messages, portions of the messages, and/or information extracted from the messages, in the memory 118 and may, for example, index the messages using a database 122. The database 122, which may refer to one or more databases, may be, or include, one or more tables, one or more relational databases, one or more multi-dimensional data cubes, and the like. Further, though illustrated as a single component implemented in the memory 118, the database 122 may, in fact, be a plurality of databases 122 such as, for instance, a database cluster, which may be implemented on a single computing device or distributed between a number of computing devices, memory components, or the like.

In operation, the advisor analyzer 108 accesses retrieved messages (e.g., from the memory 118, the message retriever 120, or the like) and analyzes the messages to identify a set of risk/return-related messages. For example, the advisor analyzer 108 may analyze message content to identify messages that are likely to relate to securities trading, wagering on sports outcomes, or the like. The set of risk/return-related messages are further analyzed to identify a set of return advisors. In embodiments, a representation of each of the identified return advisors may be stored in the database 122 and may serve, for example, as a representation identifying a record associated with the return advisor. The advisor analyzer 108 is further configured to analyze a performance of each of the return advisors and to rank the return advisors. This ranking may be based, at least in part, on the evaluations of the return advisors' respective performances. Additionally, the advisor analyzer 108 may evaluate and rank specific decisions referenced in predictive messages generated by return advisors.

The rankings may be used to facilitate one or more services. In embodiments, aspects of the services may be provided using the services component 112 which may include, for example, applications, service functions, or the like that provide enhanced assessments of the future performance of one or more items or entities, recommendations of return advisors, recommendations of risk/return-related decisions (which could be, e.g., based upon the cumulative recommendations of multiple highly-ranked return advisors), information for generating products, and the like. Additionally, the server 102 may facilitate (e.g., by providing information) generation of products based on decision rankings and/or may provide decision rankings to other entities for use in generating risk/return-related products and/or services. In embodiments, for example, securities trading recommendations may be used to generate securities portfolios, funds (e.g., exchange traded funds (ETFs)), and the like. In embodiments, the server 102 may provide wagering recommendations to booking agencies, or the like.

According to embodiments, various components of the operating environment 100, illustrated in FIG. 1, can be implemented on one or more computing devices. For example, each of the server 102, the message source 106, the objective information source 110, and the consumer device 114 may be, or reside in, one or more computing devices. A computing device may include any type of computing device suitable for implementing embodiments of the invention. Examples of computing devices include specialized computing devices or general-purpose computing devices such "workstations," "servers," "laptops," "desktops," "tablet computers," "hand-held devices," and the like, all of which are contemplated within the scope of FIG. 1 with reference to various components of the operating environment 100.

In embodiments, a computing device includes a bus that, directly and/or indirectly, couples the following devices: a processor, a memory, an input/output (I/O) port, an I/O component, and a power supply. Any number of additional components, different components, and/or combinations of components may also be included in the computing device. The bus represents what may be one or more busses (such as, for example, an address bus, data bus, or combination thereof). Similarly, in embodiments, the computing device may include a number of processors, a number of memory components, a number of I/O ports, a number of I/O components, and/or a number of power supplies. Additionally any number of these components, or combinations thereof, may be distributed and/or duplicated across a number of computing devices.

In embodiments, the memory 118 includes computer-readable media in the form of volatile and/or nonvolatile memory and may be removable, nonremovable, or a combination thereof. Media examples include Random Access Memory (RAM); Read Only Memory (ROM); Electronically Erasable Programmable Read Only Memory (EEPROM); flash memory; optical or holographic media; magnetic cassettes, magnetic tape, magnetic disk storage or other magnetic storage devices; data transmissions; or any other medium that can be used to encode information and can be accessed by a computing device such as, for example, quantum state memory, and the like. In embodiments, the memory 118 stores computer-executable instructions for causing the processor 116 to implement aspects of embodiments of system components discussed herein and/or to perform aspects of embodiments of methods and procedures discussed herein. Computer-executable instructions may include, for example, computer code, machine-useable instructions, and the like such as, for example, program components capable of being executed by one or more processors associated with a computing device. Examples of such program components include the advisor analyzer 108 (and the components thereof, illustrated in FIG. 2 and described below), the services component 112, the message retriever 120, the database 122, and the web server 210 (illustrated in FIG. 2). Some or all of the functionality contemplated herein may also be implemented in hardware and/or firmware.

The illustrative operating environment 100 shown in FIG. 1 is not intended to suggest any limitation as to the scope of use or functionality of embodiments of the present invention. Neither should the illustrative operating environment 100 be interpreted as having any dependency or requirement related to any single component or combination of components illustrated therein.

Figure 2:
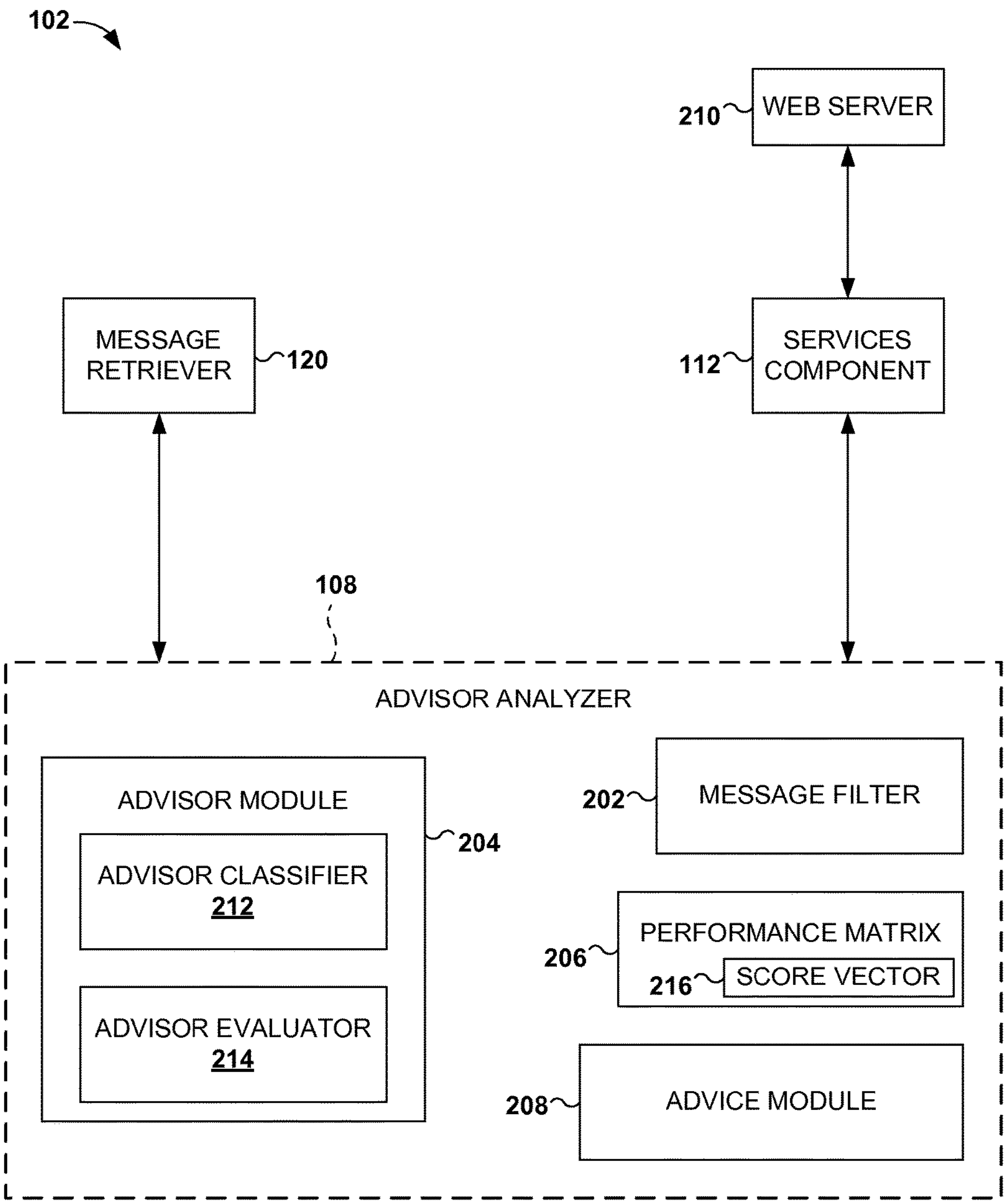
FIG. 2 is a block diagram depicting components of the server shown in FIG. 1 in accordance with embodiments of the present invention.

FIG. 2 is a block diagram depicting components of the server 102 (shown in FIG. 1) in accordance with embodiments of the present invention. As indicated above, the advisor analyzer 108 may be configured to analyze messages accessed by the message retriever 120 to identify and evaluate return advisors and corresponding risk/return-related decisions. Results of the analyses may be used to facilitate providing services to consumers (e.g., by making the results of the analyses available). For example, a web server 210 may be used to provide one or more web pages accessible by consumer devices 114. As shown in FIG. 2, the advisor analyzer 108 may include a message filter 202, an advisor module 204, a performance matrix 206, and an advice module 208. According to embodiments, any one or more of the components 202, 204, 206, and 208 of the advisor analyzer 108 depicted in FIG. 2 may share resources with, or be integrated with, various ones of the other components depicted therein (and/or components not illustrated). Additionally, any one or more of the components 202, 204, 206, and 208 may reside on the server 102 or the consumer device 114, or may be distributed between the server 102 and the consumer device 114.

According to embodiments, the message retriever 120 obtains, copies, or otherwise accesses messages and collects attributes associated with each message such as, for example, an identification of the messaging platform from which the message was accessed, an identification of the account identifier under which the message was created, an identification of the originating user of the message, an identification of a user or users to whom the message was addressed, sent, or otherwise provided, the date and time that the message was created, and content (e.g., text, hyperlinks, uniform resource locators (URLs), charts, graphs, images, and the like) included in the message. Additionally, in embodiments, other attributes specific to a messaging platform may be collected. For example, for messages sent via Twitter® (e.g., tweets), the message retriever 120 may collect properties such as hashtags, mentions, replies, indications of retweets, identifications of followers, and the like. As another example, for messages sent via Facebook®, the message retriever 120 may collect properties such as "likes," posts, indications of "status," links, friends, and the like.

The message filter 202 may identify, within the plurality of accessed messages, a set of risk/return-related messages. To identify risk/return-related messages, the message filter 202 may utilize, for example, one or more sets of rules, classifiers, and/or the like. According to embodiments, the message filter 202 utilizes a set of simple rules to maximize efficiency, thereby enabling expeditious identification of messages to facilitate services that "keep up with" the nearly real-time speed of messaging. For example, the message filter 202 may identify risk/return-related messages by identifying certain types of content in the messages such as, for example, content that appears to be associated with risk/return-related activities, character strings that are commonly associated with one or more risk/return-related activities, or the like.

For example, the message filter 202 may identify a message as a risk/return-related message if the content of the message includes one of a plurality of key words from a key word list, in combination with one or more words or phrases commonly associated with a particular risk/return-related activity and/or decision. The key word list may be created, for example, by determining the frequency with which certain words occur in messages of certain types. In embodiments, the frequency of occurrence of these words may be measured in the context of other words such as by determining the frequency of occurrence within a several word window. Words occurring with a frequency that exceeds a threshold may be included in the list. Words, character strings, and/or other text and associated context may also be analyzed in messages from known return advisors to identify key words to be included in the list. In embodiments, the list may be updated continuously, continually, or periodically to improve accuracy, account for changing trends in vocabulary, and the like.

For example, the message filter 202 may identify a tweet as a trading-related tweet if the tweet ends with "$$" and/or if the tweet contains one or more key words (e.g., buy, short, sell, add, locked, stopped out, etc.) in combination with at least one stock ticker symbol (e.g., GOOG, TRI, etc.), company name (e.g., "Google," "Thomson Reuters," etc.), fund name (e.g., "SPDR"), industry type (e.g., "energy," "financial services," "biotech," etc.) and/or the like. In embodiments, abbreviations of, portions of, and/or approximate spellings of key words, company names, fund names, and the like may be identified. In addition, words corresponding to expressions of sentiment (for example, positive or negative "feelings") associated with a risk/return-related activity, forum, or the like may be used, at least in part, to identify risk/return-related messages.

As indicated above, the set of risk/return-related messages identified by the message filter 202 originates from a set of messaging users. As shown in FIG. 2, the advisor module 204 includes an advisor classifier 212 that is configured to identify, within this set of messaging users, a set of return advisors. The advisor classifier 212 may be, or include, one or more supervised or unsupervised statistical classifiers configured to classify one or more users of the set of messaging users as return advisors. This classification may be based, for example, on a frequency of certain content from messages originated by those users, as well as other factors. For example, the advisor classifier 212 may consider a frequency with which a user propagates risk/return-related messages, a frequency and/or variety of risk/return-related activities and/or decisions referenced in the user's messages over certain time periods, a likelihood that the user actually engages in risk/return-related activities (as opposed to merely expressing opinions regarding such activities), and the like.

As shown in FIG. 2, the advisor module 204 includes an advisor evaluator 214 that is configured to evaluate a performance of each of the identified return advisors. The advisor evaluator 214 may utilize any number of different models, formulas, algorithms, classifiers, and/or the like to evaluate a performance of a return advisor based on messages associated with the return advisor. In embodiments, the advisor evaluator 214 may identify a number of predictive messages generated by the return advisor. A predictive message may include, for example, a message that includes a reference to a risk/return-related decision. The advisor evaluator 214 may, use objective historical data to determine one or more outcomes that may have resulted (e.g., financial return) from acting in accordance with each risk/return-related decision. These outcomes may be used to determine one or more decision scores corresponding to each risk/return-related decision and the decision scores may be used to determine an advisor score corresponding to the return advisor. In embodiments, return advisors may be ranked based, at least in part, on corresponding advisor scores.

In embodiments, a reference to a risk/return-related decision may include an explicit reference to a decision to act upon an implied prediction, an implied reference to a decision to act upon an implied prediction, an implied reference to a decision to act upon an explicit prediction, or the like. An example of an explicit reference to a decision to act upon an implied prediction may be a message that says "Buy TRI." In this example, the text of the message explicitly references a decision to buy stock in Thomson Reuters, Inc. ("TRI") and this decision may be based, for example, upon an implied prediction that the current price (i.e., the price near the time that the message was generated) of TRI stock will be increasing at some point in the future. An example of an implied reference to a decision to act upon an implied prediction may be a message that says "TRI is hot." In this example, the text of the message implicitly references a decision to buy TRI stock and this decision may be based, for example, upon a prediction (implied from the phrase "is hot") that the current price (i.e., the price near the time that the message was generated) of TRI stock will be increasing at some point in the future, for example, as a result of a large number of purchases that may be made shortly after the message was created. An example of an implied reference to a decision to act upon an explicit prediction may be a message that says "TRI is on the rise." In this example, the text of the message implicitly references a decision to buy TRI stock and this decision may be based, for example, upon the explicit prediction that the price of TRI stock will be increasing at some point shortly after the message was created.

In embodiments, the advisor evaluator 214 may use a supervised learning algorithm (e.g., a classifier) to identify references to risk/return-related decisions included in a particular return advisor's messages. For example, the advisor evaluator 214 may utilize a support vector machine (SVM) that analyzes features such as list-based features (e.g., whether a character sequence is included within an action list or whether a character sequence is included within a positive/negative sentiment word list), unigram and bigram word features, and the like. For example, the advisor evaluator 214 may identify a reference to a trading-related decision based on an identification of a key word in the message in combination with an object of a trading action such as, for example, a company name, a stock ticker symbol, industry type, or the like (e.g., "buy Thomson Reuters stock," "sell TRI," "buy energy," etc.).

Although the supervised learning algorithm may be trained using human supervision, in embodiments, the supervised learning algorithm may be trained using automatically-generated training data, thereby facilitating an automatic implementation. For example, training data may be automatically generated by identifying a relatively significant risk/return-related event (e.g., a large movement in the price of a security, an important win for a sports team or a horse race) and analyzing a large number of messages generated around the time of the event. The messages may be associated with a particular type of decision based on the nature of the event and may be used as training data for use in training the algorithm.

For example, in the case of securities trading, a relatively large movement in the price of a security (e.g., an increase or decrease of more than 3%) may be identified and tweets occurring around the time of the price change may be accessed. If the stock price increased, the tweets may be labeled as "buy" tweets; and if the stock price decreased, the tweets may be labeled as "sell" tweets. This labeling scheme may be facilitated by, for example, an assumption that most tweets generated when a stock price increases will be related to selling the stock, and that most tweets generated when the stock price decreases will be related to buying the stock. That is, the labeling scheme may be facilitated by an assumption that these messages will be likely to cause the algorithm to generate accurate classifications. According to embodiments, the labels need not be completely accurate, but may be sufficient for algorithm training purposes if the tweets are more likely to correspond to a decision to buy or sell stock rather than, for example, simply an opinion of a company stock.

According to embodiments, the advisor evaluator 214 may store a representation of each identified risk/return-related decision in the database 122. According to embodiments, the advisor evaluator 214 may associate each risk/return-related decision with an intensity level such as, for example, "strong," "ok," "maybe," or the like, to indicate a level of confidence/commitment of the return advisor with respect to the decision. The intensity level may be determined based on any number of different factors including, for example, a sentiment level expressed in the message, a number of users to whom the message was provided, and a number of times the message is forwarded or acknowledged (e.g., re-tweeted or "liked") by others. A sentiment level may be determined based on, for example, the presence of certain expressive words, punctuation, and/or other semantic features.

Having identified a return advisor and identified predictive messages associated therewith, the advisor evaluator 214 may evaluate the return advisor by generating a score vector 216 corresponding to the return advisor. The score vector 216 may be stored in the database 122, and may be used to compute, or otherwise determine, a performance score corresponding to the return advisor. A performance score provides an indication of a level of performance of the return advisor with respect to one or more risk/return-related decisions, items, or entities. For example, a performance score may indicate a level of success (e.g., financial return) that one might experience as a result of acting in accordance with a risk/return-related decision referenced in a predictive message generated by the return advisor. The performance score also may be based on the intensity level of the specific risk/return-related decision, which also may be used, for example, to generate a recommendation of an amount of money to be allocated to the decision. In embodiments, a number of performance scores, each associated with a particular aspect (referred to herein as a "performance metric") of the return advisor's performance, may be determined for a return advisor. That is, for example, performance scores corresponding to a trader may include a performance score associated with the trader's performance with respect to day-trading, long-term trading, trading within a particular industry sector, funds trading, and/or a combination of these.

Figures 3, 4:
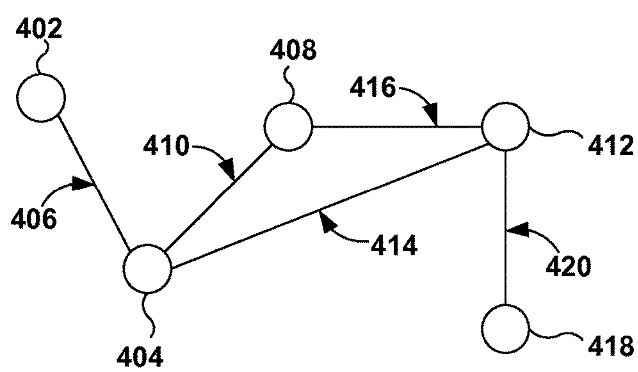
FIG. 3 is a schematic diagram depicting an illustrative performance matrix in accordance with embodiments of the present invention.
FIG. 4 is a schematic diagram depicting an illustrative graph that may be used for determining an importance score associated with a return advisor in accordance with embodiments of the present invention.

The score vector 216 may be generated, for example, by evaluating each referenced risk/return-related decision to determine a decision score. In embodiments, a risk/return-related decision may be evaluated in the context of a variety of performance metrics, thereby resulting in a score vector 216 having a number of dimensions, each corresponding to a performance metric. In embodiments, a number of such score vectors may be organized within the performance matrix 206. FIG. 3 depicts an illustrative concept of a simple performance matrix 300 (which may represent an example of the performance matrix 206) in accordance with embodiments of the invention. The performance matrix 300 includes five score vectors 302, 304, 306, 308, and 310, each corresponding to a particular decision 312, 314, 316, 318, and 320, respectively, referenced in a message on a certain date 322, 324, 326, 328, and 330, respectively. Although in the illustrated performance matrix 300, the decisions 312, 314, 316, 318, and 320 are trading decisions (e.g., "buy TRI," "sell HRB"), the decisions 312, 314, 316, 318, and 320 may be any type of risk/return-related decision, as discussed above. Additionally, each decision 312, 314, 316, 318, and 320 may include not only a date associated with the message, but also a time, location, intensity level, and/or other attribute.

As shown in FIG. 3, the performance matrix 300 may include a set of performance metrics 332, 334, 336, and 338. In the illustrated example, each of the set of performance metrics 332, 334, 336, and 338 corresponds to a trading time period—i.e., one day, one week, one month, and one year, respectively. In embodiments, any number of different types of performance metrics may be included in a performance matrix 300 in addition to, or in lieu of, any one or more of the performance metrics 332, 334, 336, and 338 illustrated in FIG. 3. Each of the score vectors 302, 304, 306, 308, and 310 also includes a set of decision scores 340, 342, 344, and 346 corresponding to the set of performance metrics 332, 334, 336, and 338, respectively.

For example, the score vector 302 includes a first decision score 340 ("S1(D)") that represents a financial return corresponding to the associated decision 312 with respect to a trading time period of one day; a second decision score ("S1(W)") 342 that represents a financial return corresponding to the associated decision 312 with respect to a trading time period of one week; a third decision score ("S1(M)") 344 that represents a financial return corresponding to the associated decision 312 with respect to a trading time period of one month; and a fourth decision score S1(Y) 346 that represents a financial return corresponding to the associated decision 312 with respect to a trading time period of one year. In the illustrated example, S1(D) 340 may be determined based on a percent gain or loss in the value of TRI stock over the course of a day (e.g., the percent gain or loss of the value of the stock from the time at which the message was created, or some arbitrary time such as 11:00 a.m., to the time at which the market closed). Similarly, S1(W) 342 may be determined based on a percent gain or loss in the value of TRI stock over the course of a week, and so on.

In embodiments, score vectors may also include decision scores that are determined based on previous decisions, which may facilitate evaluation of strategic sets of decisions by a return advisor that, for example, result in returns achieved due to a relationship between two or more decisions. For example, while S1(D) 340 may be based on a gain of 0.07% for the specified day (i.e., the percent change in the value of TRI stock between the opening price and the closing price on Mar. 4, 2013), and S3(D) 348 may be based on a loss of 1.61% for the specified day (i.e., the percent change in the value of TRI stock between the opening price and the closing price on Mar. 6, 2013), the return advisor's decision to sell TRI stock on March 6, after having purchased the stock on March 4, may result in a net gain of 1.77% (i.e., the percent change in the value of TRI stock between the opening price on March 4 and the closing price on March 6), which would result in a larger financial return than buying and selling the stock within either of the specified days. Accordingly, the score vector 302 may include, for example, a score (not shown) that is based on this strategic pair of decisions.

Additionally, in embodiments, each of the decision scores 340, 342, 344, and 346 may include a weighting based on related historical decision scores (e.g., a decision score associated with each of a pair of decisions such as the pair of decisions discussed above may be weighted more heavily than decision scores associated with individual decisions that are not identified as components of such a "strategic pair"), a weighting based on a temporal attribute of the decision score (e.g., decision scores associated with recent decisions may be weighted more heavily than those associated with older decisions), and the like. Decision scores associated with strategic pairs of decisions may, themselves, also include weightings (e.g., a decision score associated with a strategic pair of decisions such as the decision score discussed above may be weighted more heavily than decision scores associated with each of the individual decisions of the pair). In embodiments, the score vectors 302, 304, 306, 308, and 310 may be selectively aggregated, and/or otherwise analyzed, to generate score vectors (not shown) corresponding to particular entities (e.g., "TRI," "AFL," and "HRB"), particular industry sectors, ETPs, and the like. According to embodiments, any number of different performance metrics and message attributes may be analyzed to determine decision scores that reflect potential returns associated with the identified decisions. Additionally, the score vectors 302, 304, 306, 308, and 310 may be updated each time a new message is received and analyzed, each time additional objective data is obtained, and/or the like.

Similarly, for example, a performance score associated with a wagering decision may be based on an amount of return that would have been earned had a wager been placed in accordance with the decision. That is, for example, if a message generated by a sports better just before a horse race in which a horse named "Lucky Day" raced says "Lucky Day by 2 lengths," a first performance score may be generated based on an amount of return that would have been earned from placing a bet that Lucky Day would win the race; a second performance score may be generated based on an amount of return that would have been earned from placing a bet that Lucky Day would finish the race in either first place or second place; and a third performance score may be generated based on an amount of return that would have been earned from placing a bet that Lucky Day would finish the race in first place, second place, or third place.

Returning to FIG. 2, the advisor evaluator 214 may use score vectors (e.g., score vectors 302, 304, 306, 308, and 310 shown in FIG. 3) to determine performance scores corresponding to return advisors, which may be updated each time the advisor evaluator 214 analyzes a new risk/return-related message. As indicated above, performance scores may be based on different attributes such as, for example, trading timelines, types of stocks (e.g., large/small/medium, growth/value), industries (e.g., technology, utility, etc.), countries (developed country, emerging country, etc.), types of decisions (e.g., buy, sell, etc.), and the like. In this manner, the advisor evaluator 214 may evaluate return advisors based on varying decision styles, resources, and the like.

According to embodiments, the advisor evaluator 214 may also derive an importance score for each return advisor. An importance score may reflect, for example, that a large number of people appear to trust a return advisor. The importance score may be based, for example, on the return advisor's social media network. For example, in Twitter®, a return advisor may follow other return advisors, and/or be followed by others. Additionally, a return advisor's tweets may be re-tweeted. In embodiments, the advisor evaluator 214 may generate a graph to model relationships between one or more return advisors. FIG. 4 depicts an illustrative example of such a graph 400. In the illustrated embodiment, each node of the graph 400 represents a return advisor, and each edge represents an interaction (for example, follow or re-tweet) between the return advisors represented by the two connected nodes. One or more edges may form a link between two return advisors. In embodiments, the graph 400 may be undirected (e.g., in which the edges represent a directionless interaction) or directed (e.g., in which one or more of the edges represent a directed interaction such as a message being sent by one return advisor to another return advisor). In embodiments, the graph 400 may be a weighted graph in which each edge is weighted based on the number of interactions, in a specified time period, between the return advisors represented by the nodes that it links According to embodiments, such a weighting may be dynamically assigned based, for example, on one or more performance scores and/or one or more decision scores associated with the return advisor, a distance between the two nodes, and/or the like.

For example, as shown in FIG. 4, the illustrated graph 400 indicates that a first return advisor 402 is linked to a second return advisor 404 via an edge 406; the second return advisor 404 is linked to a third return advisor 408 via an edge 410 and to a fourth return advisor 412 via an edge 414. The fourth return advisor 412 is linked to the third return advisor 408 via an edge 416; and the fourth return advisor 412 is linked to a fifth return advisor 418 via an edge 420. Additionally, for example, the first return advisor 402 is linked to the fifth return advisor 418 via the combination of edges 406, 410, 416, and 420, or via the combination of edges 406, 414, and 420.

In embodiments, an importance score may be determined using any number of different graph-theory techniques. For example, an importance score associated with a return advisor may be determined based on a connectivity of the return advisor to a set of other return advisors such as, for example, those that are separated from the return advisor by no more than three nodes. That is, using the illustrative graph 400 shown in FIG. 4, an importance score of the first return advisor 402 may be determined by summing the weighted distances between the first return advisor 402 and each of the second 404, third 408, fourth 412, and fifth 418 return advisors. In this example, a distance between two nodes may be the number of edges serially linking the two nodes.

Suppose, for example, that the weighting of each of edges 406, 410, 416, and 414 is 1, indicating that there has been only one interaction between each pair of respective return advisors linked by these edges, and that the weighting of edge 420 is 2, indicating that there have been two interactions between the fourth and fifth return advisors 412 and 418. Additionally, suppose that an importance score of a return advisor is determined based on the connectivity of the return advisor to the set of other return advisors that are linked to the return advisor by no more than two edges. The importance score of the first return advisor 402, then, may be determined to be $S_i$(402)=$D_w$(402-404)+$D_w$(402-408)+$D_w$(402-412), where $S_i$ is the importance score of the return advisor associated with node 402 (i.e., the first return advisor) and $D_w$ is the weighted distance between the identified nodes. Thus, in the example of FIG. 4, $S_i$(402)=1(1)+(1(1)+1(1))+(1(1)+1(1))=5, whereas the importance score of the fifth return advisor 418 is Si(418)=$D_w$(418-412)+$D_w$(418-408)+$D_w$(418-404)=1(2)+(1(2)+1(1))+(1(2)+1(1))=8. Here, the importance score of the fifth return advisor 418 is greater than that of the first return advisor 402 because the fifth return advisor 418 has interacted more with an adjacent return advisor 412.

Increased numbers of interactions with, and/or connections to, a return advisor may suggest that the return advisor is a more trusted return advisor, a more active return advisor, or the like, as opposed to a return advisor with a lower importance score. For example, a celebrity that only occasionally tweets about his or her securities trades may, nevertheless, have a high importance score compared to other return advisors because the celebrity has a large number of followers and may actually influence a stock price by tweeting about a decision related to that stock (e.g., when large numbers of users following the celebrity's tweets buy shares of the stock because the celebrity recommended that they do so, the price of the stock may rise). According to embodiments, other techniques for utilizing graphs such as, for example, techniques that involve matrix analysis, Markov chains, game theory, and the like, may be used to determine importance scores associated with return advisors.

For a specified set of performance metrics, the advisor evaluator 214 may determine an advisor score based on one or more performance scores, importance scores, and the like. For example, for a specified trading time period and stock type, the advisor evaluator 214 may determine an advisor score based on a weighted combination (e.g., sum) of the corresponding performance score and one or more importance scores. Return advisors may be ranked based on the advisor scores. Additionally, in embodiments, the advisor evaluator 214 may identify the return advisors with the highest scores and label those return advisors as, for example, winning return advisors. For example, winning advisors may include advisors whose scores exceed a threshold. A list of winning return advisors may be dynamic, as an advisor score associated with a return advisor may be updated, for example, based on each new risk/return-related message that is accessed. Further, in embodiments, separate lists of winning return advisors may be generated for different performance metrics, sets of performance metrics, or the like. For example, some traders may have a high score if evaluated based on long-term stock performance, other traders may have a high score only in a technology domain, and the like. In this manner, lists of winning return advisors may be utilized to provide beneficial recommendations of return advisors and/or decisions for different purposes, decision-styles, and the like.

As indicated above, the advisor analyzer 108 also includes an advice module 208. According to embodiments, the advice module 208 is configured to evaluate decisions referenced in return advisors' messages. In embodiments, the advice module 208 may identify a first risk/return-related decision based on a recent decision referenced in a message generated by a first return advisor and may identify a second risk/return-related decision based on a recent decision referenced in a message generated by a second return advisor. The advice module 208 may utilize information resulting from the evaluation of the first and second return advisors, information from an objective information source (e.g., the objective information source 110 shown in FIG. 1), and/or other information to assign a first decision ranking to the first risk/return-related decision and a second decision ranking to the second risk/return-related decision. In embodiments, a decision ranking may be based, for example, on a decision score that represents a likely level of return or confidence associated with the decision. In embodiments, the decision rankings may be utilized by the services component 112, provided to consumers, or the like.

In embodiments, decision rankings may be calculated in the context of one or more attributes, performance metrics, or the like. Additionally, in embodiments, the advice module 208 may utilize sentiment associated with the relevant risk/return domain (e.g., market sentiment) as guidance to recommend other aspects of a decision (e.g., an amount of money to be used to purchase securities or wager on a sports team, odds to be used when wagering, and the like). For example, in embodiments, the advice module 208 may allocate a percentage of a total amount of money to each of a number of recommended decisions by incorporating market sentiment into a determination of a decision score and by dividing the decision score by a sum of all of the recommended decisions.

According to embodiments, the advice module 208 may employ one or more different strategies in identifying decisions to recommend. For example, the advice module may recommend all of the identified decisions generated by return advisors, the most commonly recommended decisions, the least commonly recommended (e.g., unique) decisions, decisions generated by winning return advisors, and/or the like. Additional strategies may be utilized as well. For example, in embodiments in which the advice module 208 evaluates securities trade decisions, the advice module 208 may compare the number of recent messages containing a reference to a decision associated with buying stock with the number of recent messages containing a reference to a decision associated with selling stock. If the buy decisions outnumber the sell decisions, for example, the advice module 208 may recommend buying shares in a particular exchange traded product (ETP) such as, for example, the SPDR® S&P 500 fund; whereas if the sell decisions outnumber the buy decisions, the advice module 208 may recommend selling shares of the SPDR® S&P 500 fund.

Figure 5:
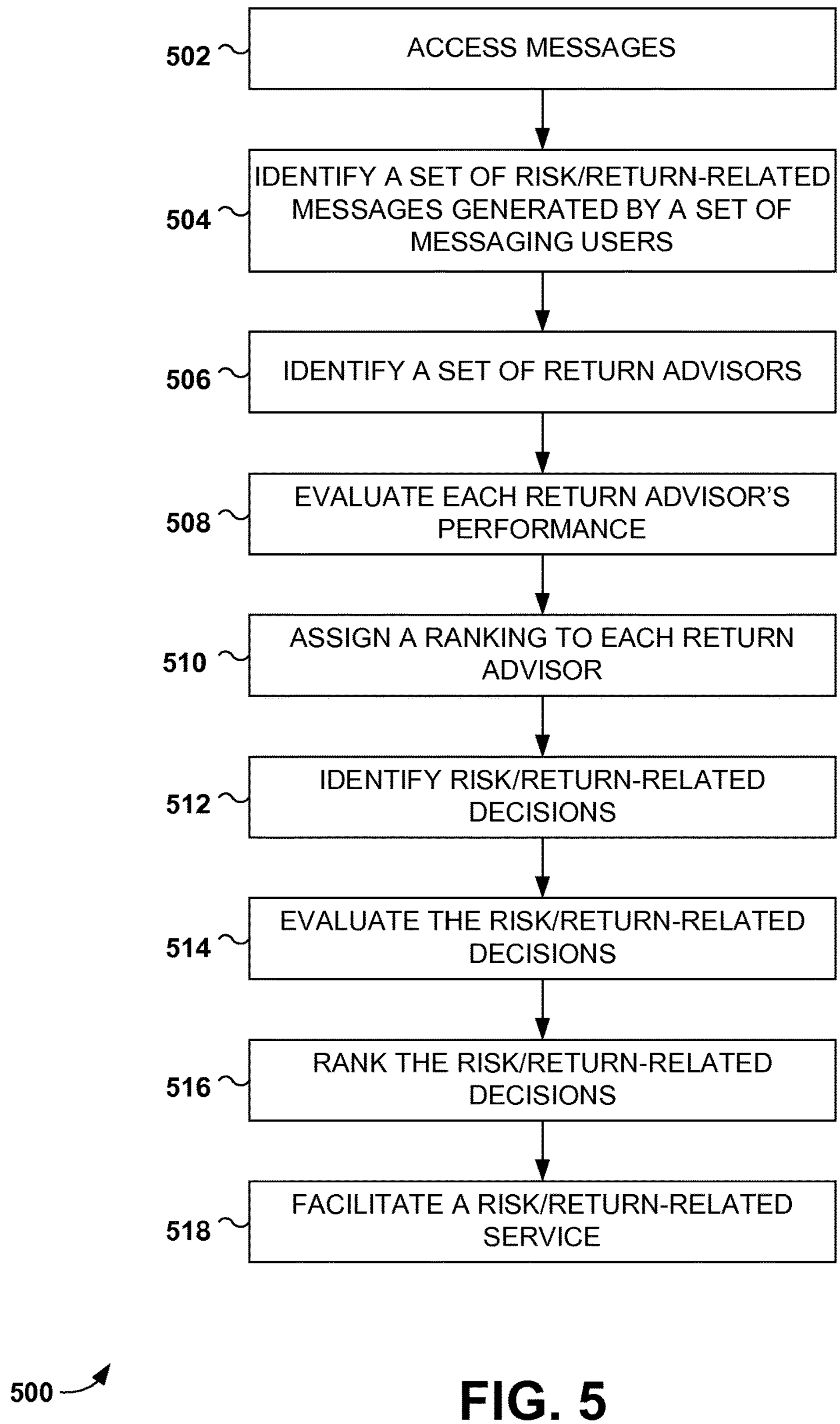
FIG. 5 is a flow diagram depicting an illustrative method of identifying and evaluating return advisors in accordance with embodiments of the present invention.

As described above, an advisor analyzer (e.g., the advisor analyzer 108 shown in FIG. 1) may analyze messages to facilitate identification and evaluation of return advisors and associated risk/return-related decisions. Results of the evaluations may facilitate enhanced assessments of future performances of items or entities, which may be used to provide risk/return-related services. FIG. 5 is a flow diagram depicting an illustrative computer-implemented method 500 for providing an assessment of future performance of an item or entity. Embodiments of the illustrative method 500 include accessing a number of messages (block 502). The messages may include any number of different types of messages such as, for example, social media messages, emails, SMS messages, blog posts, reply posts, web-published articles, and the like. In embodiments, a server (e.g., the server 102 shown in FIG. 1) may implement a message retriever (e.g., the message retriever 120 shown in FIG. 1) that retrieves, copies, or otherwise accesses messages from a message source (e.g., message source 106 shown in FIG. 1).

A message filter (e.g., the message filter 202 shown in FIG. 2) identifies, within the messages, a set of risk/return-related messages (block 504). The set of risk/return-related messages originates from a set of message users. In embodiments, the message filter may identify risk/return-related messages by implementing one or more statistical classifiers. Using the set of risk/return-related messages, an advisor classifier (e.g., the advisor classifier 212 shown in FIG. 2) identifies, within the set of messaging users, a first return advisor and a second return advisor (block 506). A performance of each of the set of return advisors is evaluated (block 508). In embodiments, evaluating the performance of a return advisor may include, for example, analyzing a set of predictive social media messages generated by the return advisor.

Embodiments of the method 500 further include assigning an advisor ranking to each return advisor (block 510). Each advisor ranking may, for example, be based on one or more performance scores corresponding to the return advisor. Embodiments of the method 500 further include identifying risk/return-related decisions based on references to recent risk/return-related decisions in messages generated by the return advisors (block 512), and evaluating the risk/return-related decisions (block 514). Decision rankings may be assigned to risk/return-related decisions (block 516) and a risk/return-related service may be provided based on the decision rankings (518).

EXAMPLE

An experiment relating to securities trading was conducted during the trading period of Mar. 28, 2012 through Jun. 20, 2012. Large samples of tweets generated during this time period were examined to identify a set of trading-related tweets that originated from a set of Twitter® users. Using the set of trading-related tweets, a binary classifier was used to classify each user as either a trader or not a trader. In this context, a user was classified as a trader if the user's tweets indicated that the user tweets about securities and their securities trading activities.

Tweets including references to trading decisions were identified for each of the traders and score vectors were determined for each of the traders by calculating, for each identified decision, an amount of return that would have been realized if that decision had been followed for one day. That is, for example, where a tweet included a reference to a decision to purchase stock in a certain company on a certain day, a decision score was calculated based on the amount of return that would have been earned (or lost) if a share of that stock had been purchased at the beginning of trading on that day and then sold at the close of the same trading day. Performance scores were determined based on aggregations of the score vectors, and the traders were ranked to identify 120 winning traders.

The one day time period returns corresponding to each of five different recommendation strategies were aggregated over the study period and the results were compared to the aggregated daily return values of the SPDR® S&P 500 fund. The five sets of decisions included: "All Trades" (the sum of returns associated with following all of the trading decisions); "Top Trades" (the sum of returns associated with following the most commonly recommended trades); "Unique Trades" (the sum of returns associated with following the least frequently recommended trades); "Majority" (the sum of returns associated with following the set of trading decisions that occurred most frequently among the identified traders); and "Winners" (the sum of returns associated with following the 120 highest ranked traders, where the ranking of the traders was updated daily).

Figure 6:
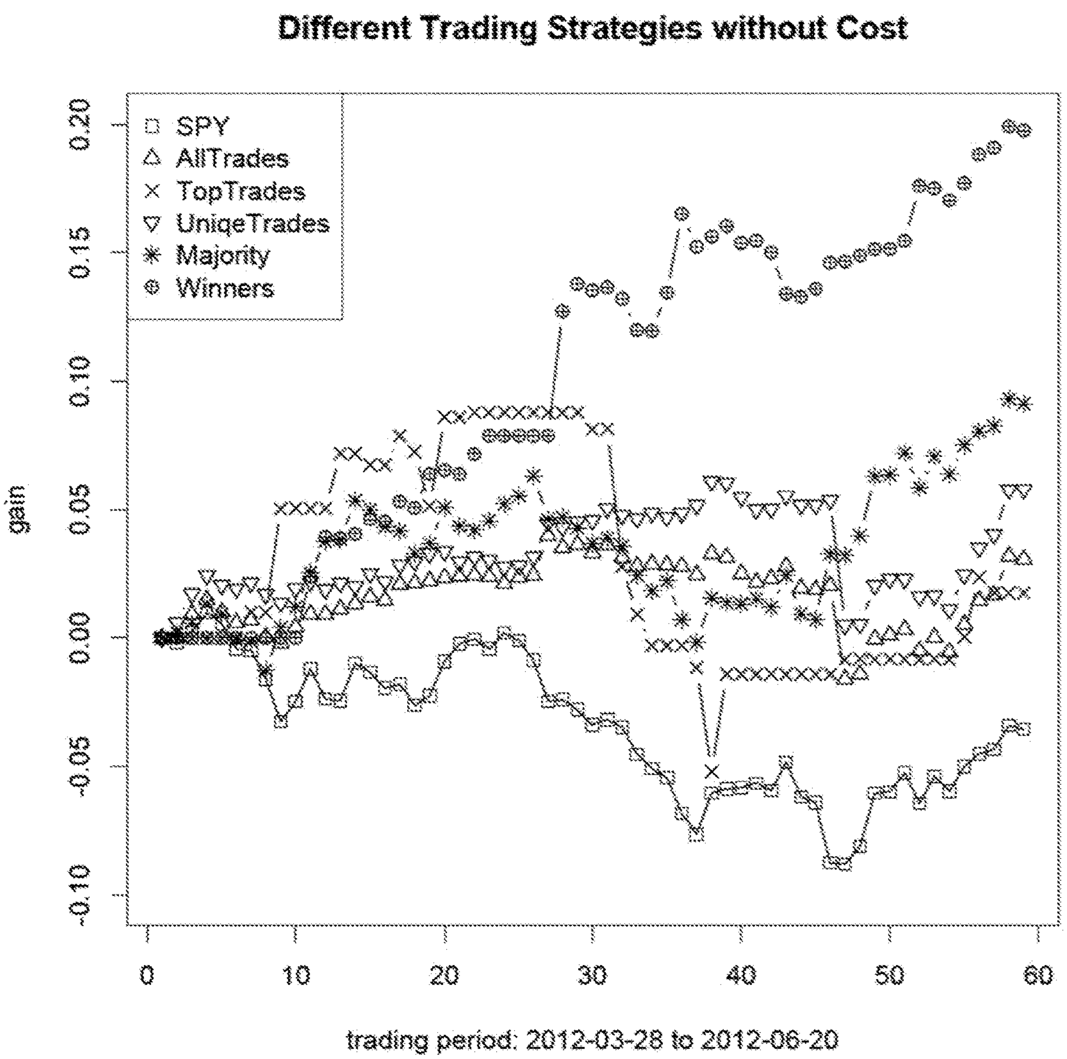
FIG. 6 is a chart showing results of an illustrative example of evaluating return advisors in accordance with embodiments of the present invention.
Figure 7:
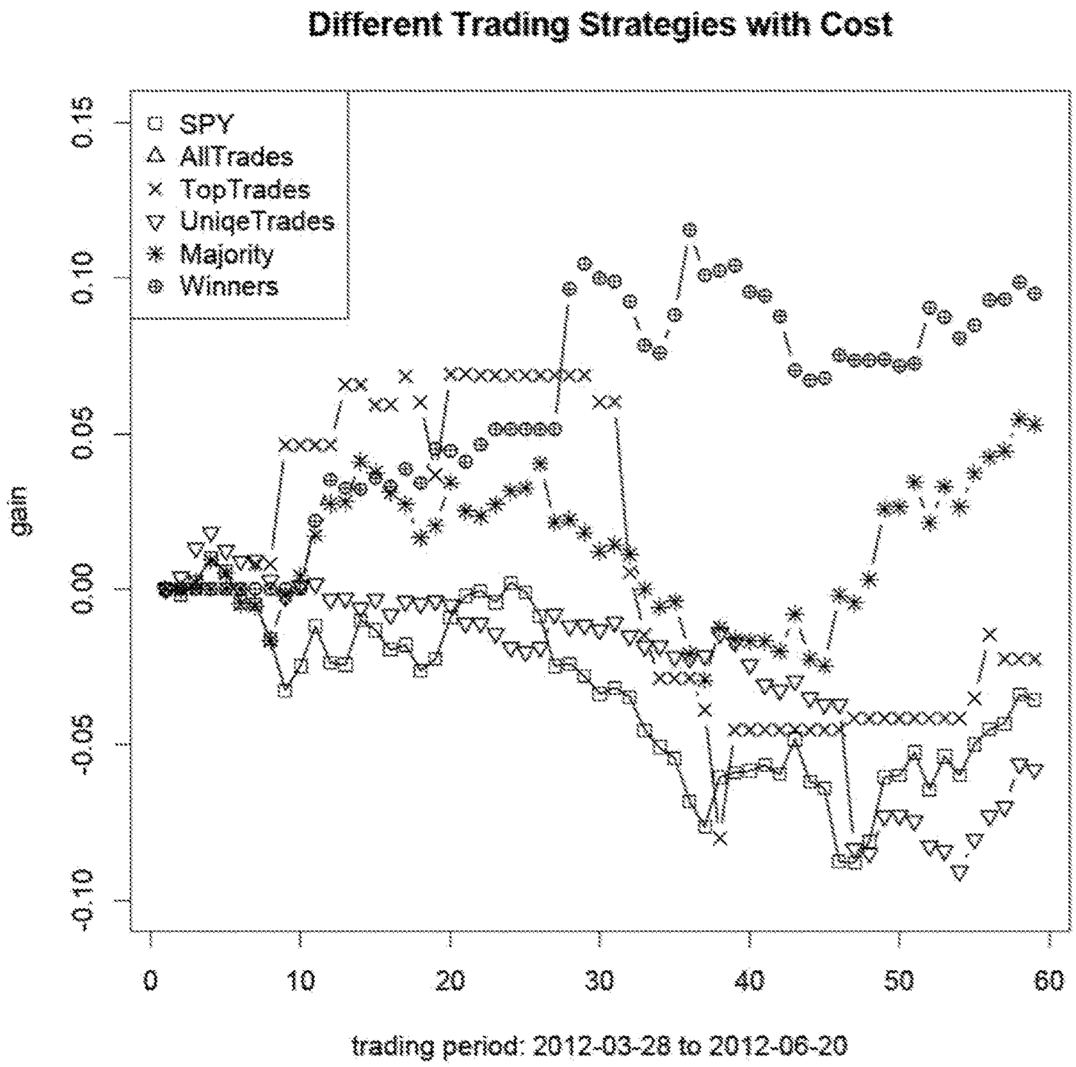
FIG. 7 is another chart showing results of an illustrative example of evaluating return advisors in accordance with embodiments of the present invention.

FIG. 6 is a chart plotting the aggregated daily returns of the SPDR® S&P 500 fund ("SPY") against the aggregated daily returns for each of these recommendation strategies, without considering the cost of each transaction. FIG. 7 is a chart plotting the data plotted in FIG. 6, with adjustments made based on an arbitrarily-determined cost of 0.2% for each transaction. The experiment produced the unexpected result that, while the SPDR® S&P 500 fund lost 3.55% over the time period of the experiment, securities trade actions taken in accordance with recommendations generated using aspects of embodiments of the present invention gained 19.76% (where transaction cost was not included) and 9.48% (where transaction cost was included), thereby outperforming the SPDR® S&P 500 fund by 23.31% or 13.03%, respectively, as shown in FIGS. 6 and 7.

While embodiments of the present invention are described with specificity, the description itself is not intended to limit the scope of this patent. Rather, the inventors have contemplated that the claimed invention might also be embodied in other ways, to include different steps or features, or combinations of steps or features similar to the ones described in this document, in conjunction with other technologies.

The following is claimed:

1. A computer-implemented method comprising:

accessing, using a computing device having a processor and a memory, a first set of a plurality of social media messages from a message source comprising a platform that enables users to share information with groups of other users through a network;

automatically generating a key word list with a plurality of key words selected to identify securities and/or trading-related messages, the key word list automatically generated by determining that a frequency of occurrence of words in the social media messages is greater than a threshold;

storing the key word list in the memory;

identifying a plurality of return advisors from the users of the platform by determining that the users' messages include securities and/or trading-related messages at a frequency greater than a frequency threshold;

identifying, within the first set of the plurality of social media messages and using the processor and the key word list, a plurality of predictive trading-related messages relating to the plurality of securities;

associating, using the processor, the identified plurality of predictive trading-related messages with the identified plurality of return advisors;

determining, using the processor, historical performance of the identified plurality of return advisors based at least in part on historical data and the identified plurality of predictive trading-related messages;

assigning, using the processor and based at least in part on the determined historical performance of the identified return advisors, a ranking of to the identified plurality of return advisors;

storing the rankings in the memory;

accessing, using the computing device, a second set of a plurality of social media messages from the message source;

identifying, within the second set of the plurality of social media messages and using the processor and the key word list, a second set of a plurality of predictive trading-related messages relating to the plurality of securities;

performing an assessment of the future performance of the plurality of securities based on the rankings and the second set of the plurality of predictive trading-related messages; and providing a securities trade decision recommendation based on at least the assessment of the future performance of the plurality of securities.

2. The method of claim 1, wherein at least one of the first and second sets of predictive messages comprises a tweet.

3. The method of claim 1, wherein the plurality of predetermined key words includes a ticker symbol, a company name, a fund name, a "$$" symbol, and a key word.

4. The method of claim 1, wherein determining historical performance comprises:

identifying, in at least one of the trading-related predictive messages, at least one reference to at least one trade-related decision and determining an amount of financial return that would have resulted from acting in accordance with the at least one trade-related decision.

5. The method of claim 4, wherein determining historical performance comprises:

determining a number of social media interactions between the identified return advisors and one or more additional return advisors;

determining an importance score based on the number of social media interactions; and determining a performance score based on the amount of financial return and the importance score.

6. The method of claim 1, wherein identifying the plurality of return advisors comprises using a classifier configured to classify a messaging user as a return advisor by analyzing content of a plurality of messages generated by the messaging user.

7. A computer-implemented method comprising:

accessing a plurality of social media messages from a social media platform that enables users to share information with groups of other users through a network;

automatically training a classifier to identify risk/return-related decisions in the plurality of social media messages by:

identifying an event of a relatively large movement in price of a security, identifying social media messages published before and after the identified event, and automatically labeling the identified social media messages as buy messages if the event is associated with a price increase, and labeling the identified social media messages as sell messages if the event is associated with a price decrease;

identifying, within the set of social media messages and using a processor and the trained classifier, a plurality of trading-related messages, wherein the plurality of trading-related messages originates from a set of social media users;

identifying, within the set of social media users and using the processor, a first trader and a second trader, by analyzing the plurality of predictive messages by determining that the first trader's messages and the second trader's messages include securities and/or trading-related messages at a frequency greater than a frequency threshold;

evaluating, using the processor, a performance of the first trader, wherein evaluating the performance of the first trader comprises analyzing a set of trading-related messages associated with the first trader;

evaluating, using the processor, a performance of the second trader, wherein evaluating the performance of the second trader comprises analyzing a set of trading-related messages associated with the second trader;

assigning, using the processor, a first ranking to the first trader and a second ranking to the second trader, wherein the first and second rankings are based on the performances of the first and second traders, respectively;

providing a securities trade decision recommendation based on at least one of the first and second rankings; and generating, using the securities trade decision recommendation, a securities portfolio and/or a securities fund.

8. The method of claim 7, wherein each of the set of trading-related messages comprises at least one of a ticker symbol, a company name, a fund name, a "$$" symbol, and a key word.

9. The method of claim 7, wherein evaluating the performances of the first and second traders comprises determining, for each of the first and second traders, a performance score associated with at least one performance metric, wherein the performance score is based on an amount of financial return that resulted, or would have resulted, from acting in accordance with a set of trade decisions associated with the respective trader, the performance metric comprising at least one of a specified company, a specified trading time period, and a specified industry type.

10. The method of claim 7, wherein the securities fund comprises an exchange traded fund (ETF).

11. The method of claim 7, wherein providing the trade decision recommendation comprises:

identifying a reference to a first trade decision in at least one of the first set of trading-related messages;

identifying a reference to a second trade decision in at least one of the second set of trading-related messages;

assigning a first decision ranking to the first trade decision;

assigning a second decision ranking to the second trade decision; and recommending either the first trade decision or the second trade decision based on the first and second decision rankings.

12. A system comprising:

a server configured to receive, from a message source, a plurality of messages generated by a plurality of messaging users, the server comprising a processor that instantiates a plurality of software components stored in a memory, the message source comprising a platform that enables users to share information with groups of other users through a network, the plurality of software components comprising:

an advisor analyzer including a message filter configured to identify the plurality of messages as risk/return-related messages if the content of a given message includes one of a plurality of key words from a key word list in combination with one or more words or phrases associated with risk/return-related activity and/or decisions, the key word list generated by determining that a frequency of occurrence of words in the plurality of messages is greater than a threshold, the advisor analyzer configured to:

(a) identify a plurality of return advisors by analyzing the plurality of messages by determining that users' messages include securities and/or trading-related messages at a frequency greater than a frequency threshold, (b) associate the identified plurality of return advisors with the identified risk/return-related messages, (c) determine performance of the plurality of return advisors based on the associated risk/return-related messages and historical data, and (d) assign rankings to the plurality of return advisors based on the determined performances; and a services component configured to provide a risk/return-related service based on the rankings, wherein the services component is configured to provide the risk/return-related service by generating a product based on the rankings.

13. The system of claim 12, the advisor analyzer comprising an advice module configured to:

identify a reference to a first risk/return-related decision in at least one message;

identify a reference to a second risk/return-related decision in at least one message;

assign a first decision ranking to the first risk/return-related decision; and assign a second decision ranking to the second risk/return-related decision, wherein the first decision ranking is greater than the second decision ranking when acting in accordance with the first risk/return-related decision is likely to result in a greater financial return than acting in accordance with the second risk/return-related decision.

14. The system of claim 12, the plurality of messages comprising at least one tweet.

* * * * *